(12) United States Patent
Mao et al.

(10) Patent No.: US 11,482,916 B2
(45) Date of Patent: Oct. 25, 2022

(54) LINEAR MOTOR

(71) Applicant: AAC Technologies Pte. Ltd., Singapore (SG)

(72) Inventors: Lubin Mao, Shenzhen (CN); Zhaoxian Chen, Shenzhen (CN); Zijie Zhang, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 220 days.

(21) Appl. No.: 16/729,481

(22) Filed: Dec. 30, 2019

(65) Prior Publication Data
US 2020/0304005 A1   Sep. 24, 2020

(30) Foreign Application Priority Data
Mar. 20, 2019   (CN) .......................... 201920358870.4

(51) Int. Cl.
*H02K 33/18*   (2006.01)
(52) U.S. Cl.
CPC .................................. *H02K 33/18* (2013.01)
(58) Field of Classification Search
CPC ..................................................... H02K 33/18
See application file for complete search history.

(56) References Cited

U.S. PATENT DOCUMENTS

| 5,270,594 | A | * | 12/1993 | Hulsing, II | ............... | H01F 7/14 |
| | | | | | | 310/15 |
| 2018/0111162 | A1 | * | 4/2018 | Xu | .......................... | H02K 33/18 |
| 2019/0052160 | A1 | * | 2/2019 | Oi | .......................... | H02K 33/02 |

FOREIGN PATENT DOCUMENTS

CN   206524745 U   *   9/2017
JP   03296112 A   *   12/1991

OTHER PUBLICATIONS

Chen (CN 206524745 U) English Translation (Year: 2017).*
Fujiwara (JP 03296112 A) English Translation (Year: 1991).*

* cited by examiner

*Primary Examiner* — Tulsidas C Patel
*Assistant Examiner* — Robert E Mates
(74) *Attorney, Agent, or Firm* — W&G Law Group

(57) ABSTRACT

The present application discloses a linear motor, which includes a housing having a receiving cavity, a vibrator received in the receiving cavity, a stator received in the receiving cavity, and a flexible support connecting to the housing and suspending the vibrator in the receiving cavity. The stator includes an iron core fixed to the housing and a coil winded on the iron core. The iron core includes a first iron core and a second iron core perpendicular to the first iron core, the coil includes a first coil winded on the first iron core and a second coil winded on the second iron core, and the winding directions of the first coil and the second coil are perpendicular to each other. The linear motor of the present invention not only effectively widens the working frequency band of the motor, but also enriches the vibration effect of the motor.

17 Claims, 6 Drawing Sheets

A-A

LINEAR MOTOR

FIELD OF THE PRESENT INVENTION

The present invention relates to the field of linear motors, and more particularly to a linear motor applied to portable consumer electronic product.

DESCRIPTION OF RELATED ART

With the development of electronic technology, portable consumer electronics are increasingly popular to customers, such as mobile phones, handheld game players, navigation devices, and handheld multimedia entertainment devices, etc. Linear motors are generally applied to the consumer electronics to give system feedbacks, for instance, to give feedbacks for incoming calls and messages of mobile phones, navigation prompts of navigation devices, or vibration feedback of game players.

In related art, a linear motor commonly includes a housing, a vibrating member, a magnet assembly, and a flexible support. The flexible support suspends and supports the vibrating member in the housing. The magnet assembly includes a magnetic steel and a coil, which work together to generate a unidirectional driving force, for example, a driving force along the horizontal X direction. However, the unidirectional driving merely takes advantage of one vibration mode of the system within a narrow frequency band, which can only provide users a monotonous vibration experience.

Therefore, it is desirable to provide a new linear motor.

SUMMARY OF THE PRESENT INVENTION

The present invention is to provide a linear motor with broad vibration frequency bandwidth and rich vibration effect.

The linear motor provided in the present invention includes a housing having a receiving cavity, a vibrator received in the receiving cavity, a stator received in the receiving cavity, and a flexible support connecting to the housing and suspending the vibrator in the receiving cavity. The stator includes an iron core fixed to the housing and a coil winded on the iron core. The iron core includes a first iron core and a second iron core perpendicular to the first iron core, the coil includes a first coil winded on the first iron core and a second coil winded on the second iron core, and the winding directions of the first coil and the second coil are perpendicular to each other.

In some embodiments, there are two second iron cores, one of the second iron core is disposed at one side of the first iron core and the other is disposed at the other side of the first iron core.

In some embodiments, the vibrator includes a mass block fixedly connected to the flexible support, the mass block comprises a through hole passing through the mass block along a direction vertical to the vibrating direction, and the iron core and the coil both extend into the through hole.

In some embodiments, the mass block comprises an inner wall in rectangular shape, the inner wall comprises the through hole, the inner wall includes a first sidewall parallel to the short axis and a second sidewall connected to the first sidewall and parallel to the long axis, and the second iron core is disposed parallel to the second sidewall.

In some embodiments, the vibrator further includes a magnetic steel fixed to the inner wall, and the magnetic steel is disposed spaced from the first coil and the second coil respectively.

In some embodiments, the magnetic steel includes a first magnetic steel fixed to the first sidewall and a second magnetic steel fixed to the second sidewall.

In some embodiments, the first magnetic steel is magnetized along a direction vertical to a thickness direction of the first sidewall, the first magnetic steel includes two, and the two first magnetic steels are oppositely arranged with the same magnetic poles.

In some embodiments, the second magnetic steel is magnetized along a direction vertical to a thickness direction of the second vertical sidewall, the second magnetic steel includes two, and the two second magnetic steels are oppositely arranged with the same magnetic poles.

In some embodiments, the vibrator further includes a concentrating flux plate disposed between the magnetic steel and the inner wall.

In some embodiments, the iron core includes a middle portion for winding the coil and two pole shoes located at two ends of the middle portion, and the pole shoes are fixed to the housing.

In some embodiments, the housing includes a middle housing, an upper cover covering one end of the middle housing, and a lower cover covering the other end of the middle housing, the middle housing, the upper cover, and the lower cover cooperatively comprises the receiving cavity, and the pole shoes are fixed to the lower cover.

In some embodiments, the linear motor includes a baffle plate fixed to the upper cover and/or the lower cover, and the mass block is provided with an avoiding portion for avoiding the baffle plate.

In some embodiments, the flexible support includes a first fixing portion fixedly connected to the middle housing, a second fixing portion fixedly connected to the mass block, and a connecting portion connected with the first fixing portion and the second fixing portion.

The linear motor of the present invention is provided with magnetic assemblies that are perpendicular to each other and arranged linearly, which is convenient to be assembled. The linear motor generates driving forces in two different directions of X and Y by utilizing different magnetic-field components; by matching with the flexible support of the present invention, the linear motor may realize a double f0 vibration output. It not only effectively widens the working frequency band of the motor, but also enriches the vibration effect of the motor.

BRIEF DESCRIPTION OF THE DRAWINGS

To clearly illustrate the technical solutions that are reflected in various embodiments according to this disclosure, the accompanying drawings intended for the description of the embodiments herein will now be briefly described. It is evident that the accompanying drawings listed in the following description show merely some embodiments according to this disclosure, and that those having ordinary skill in the art will be able to obtain other drawings based on the arrangements shown in these drawings without making inventive efforts.

DETAILED DESCRIPTION OF THE EXEMPLARY EMBODIMENT

The technical solutions of the embodiments of the present invention will be clearly and completely described in the following with reference to the accompanying drawings. It is obvious that the embodiments to be described are only a part rather than all of the embodiments of the present invention. All other embodiments obtained by persons skilled in the art based on the embodiments of the present invention without creative efforts shall fall within the protection scope of the present invention.

Figure 1:
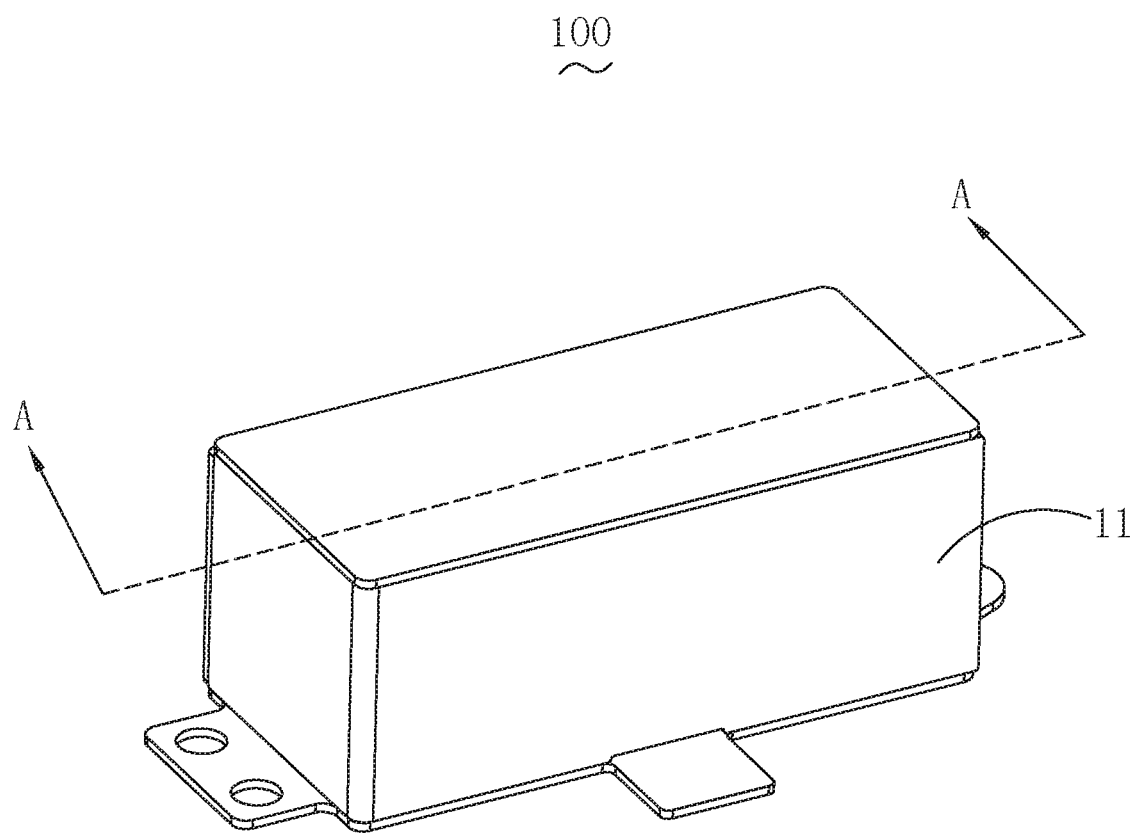
FIG. 1 is an illustrative assembled view of a linear motor in accordance with an embodiment of the present invention.
Figure 2:
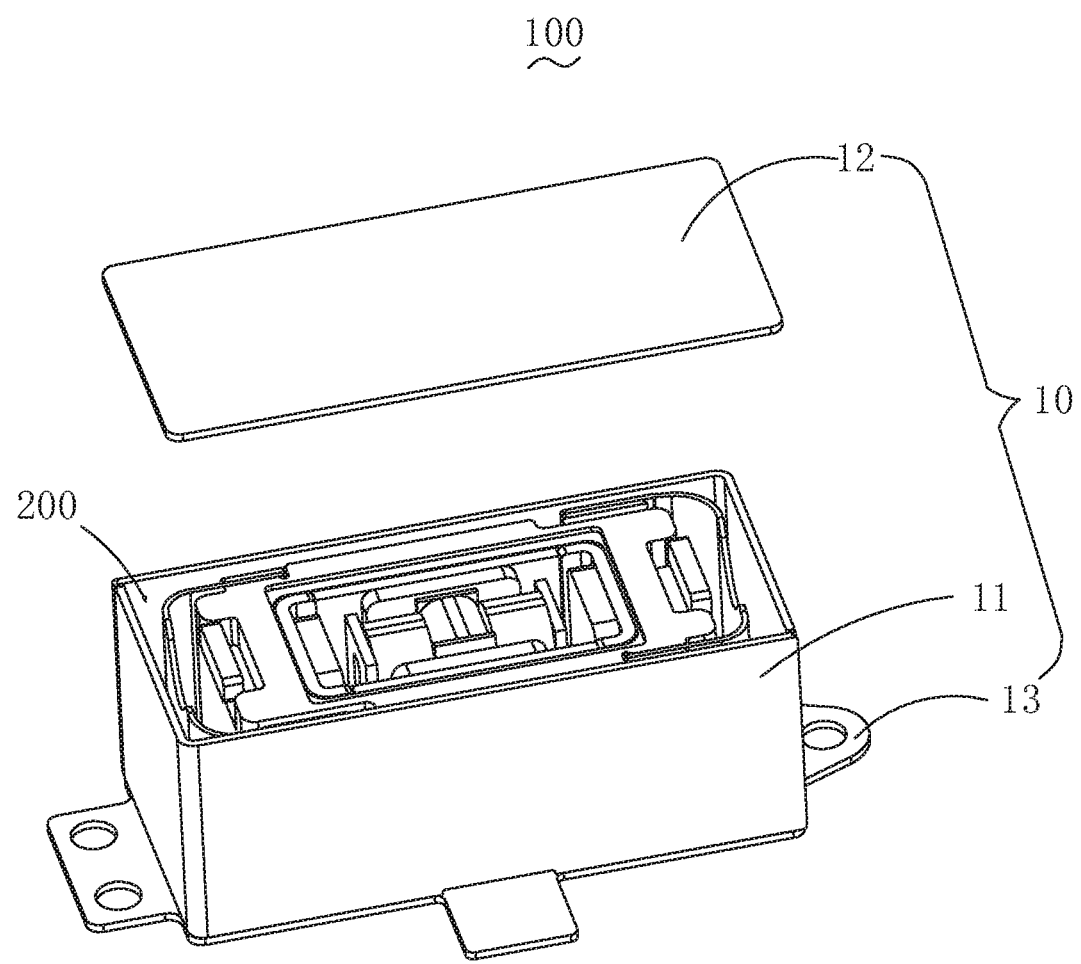
FIG. 2 is an illustrative partial exploded view of the linear motor in accordance with an embodiment of the present invention.
Figure 3:
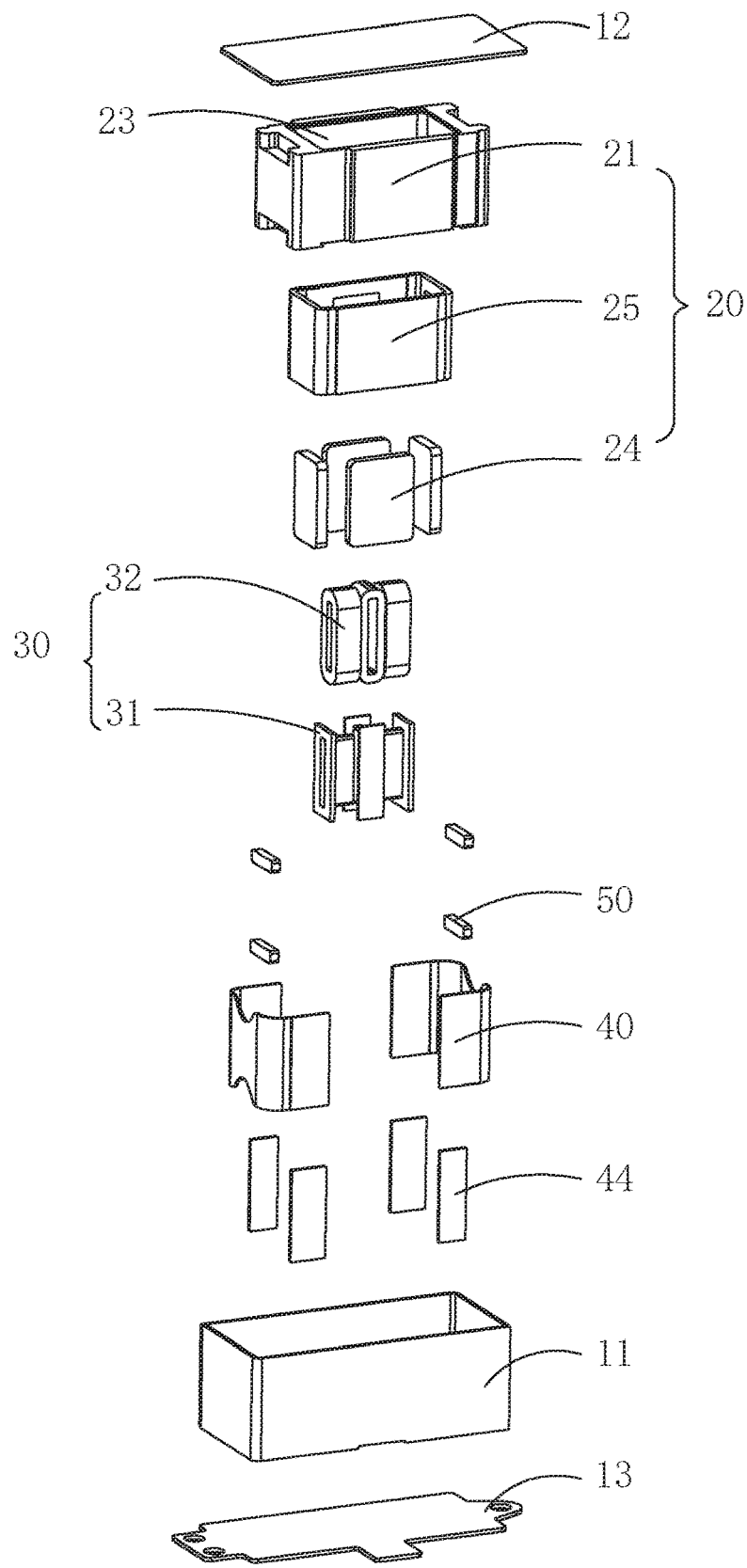
FIG. 3 is an illustrative exploded view of the linear motor in accordance with an embodiment of the present invention.

Please referring to FIGS. 1 to 3, a linear motor 100 is provided. The linear motor 100 includes a housing 10 having a receiving cavity 200, a vibrator 20 received in the receiving cavity 200, a stator 30 received in the receiving cavity 200, and a flexible support 40 connecting to the housing 10 and suspending the vibrator 20 in the receiving cavity.

As shown in FIG. 3, specifically, the housing 10 includes a middle housing 11, an upper cover 12 covering one end of the middle housing 11, and a lower cover 13 covering the other end of the middle housing 11. The middle housing 11, the upper cover 12, and the lower cover 13 cooperatively comprise the receiving cavity 200.

Figure 4:
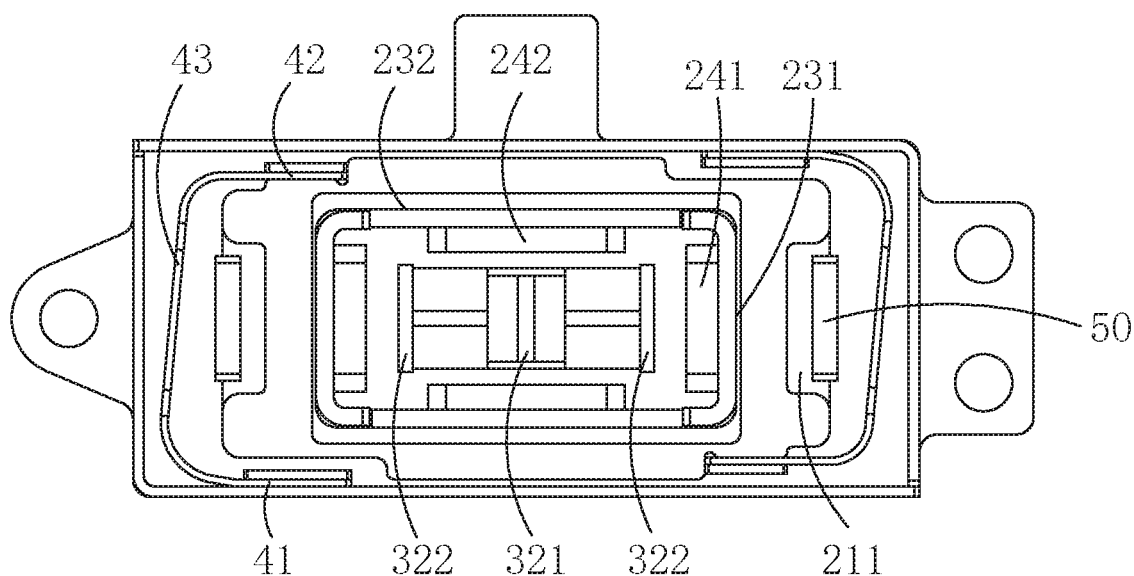
FIG. 4 is an illustrative top view showing the inner structure of the linear motor in accordance with an embodiment of the present invention.
Figure 8:
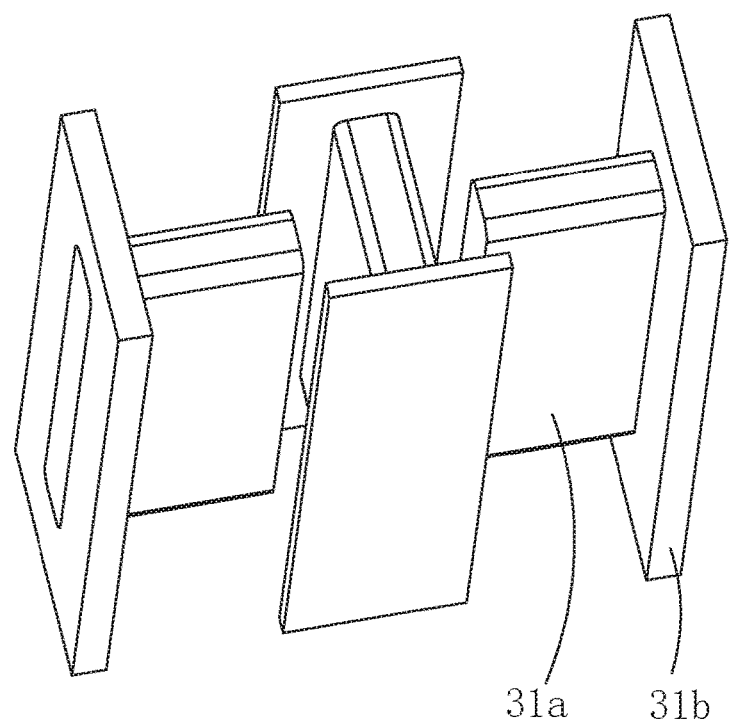
FIG. 8 is an n illustrative assembled view of an iron corn of the linear motor in accordance with an embodiment of the present invention.

Please referring to FIGS. 3 and 4, the vibrator 20 includes a mass block 21 fixedly connected to the flexible support 40. The mass block 21 comprises a through hole 22 passing through the mass block 21 along a direction perpendicular to the vibrating direction. In the exemplary embodiment, the vibrating direction is the "X" direction or the "Y" direction as shown in FIG. 8. The mass block 21 further comprises an inner wall 23 in rectangular shape, and the inner wall 23 comprises the through hole 22. The inner wall 23 includes a first sidewall 231 parallel to the short axis and a second sidewall 232 connected to the first sidewall 231 and parallel to the long axis.

The vibrator 20 further includes a magnetic steel 24 fixed to the inner wall 23. In the exemplary embodiment, the vibrator 20 also includes a concentrating flux plate 25, and the magnetic steel 24 is fixed to the concentrating flux plate 25. The magnetic steel 24 includes a first magnetic steel 241 fixed to the first sidewall 231 and a second magnetic steel 242 fixed to the second sidewall 232. In the exemplary embodiment, two first magnetic steels 241 and two second magnetic steels 242 are provided to enhance the magnetic circuit performance of the linear motor. In the exemplary embodiment, there are two first sidewalls 231 and two second sidewalls 232, each of the first sidewalls 231 is fixed with one first magnetic steel 241, and each of the second sidewalls 232 is fixed with one second magnetic steel 242. The first magnetic steel 241 is magnetized along a direction vertical to a thickness direction of the first sidewall 231, and the two first magnetic steels 241 are oppositely arranged with the same magnetic poles. Similarly, the second magnetic steel 242 is magnetized along a direction vertical to a thickness direction of the second vertical sidewall 232, and the two second magnetic steels 242 are oppositely arranged with the same magnetic poles.

Figure 6:
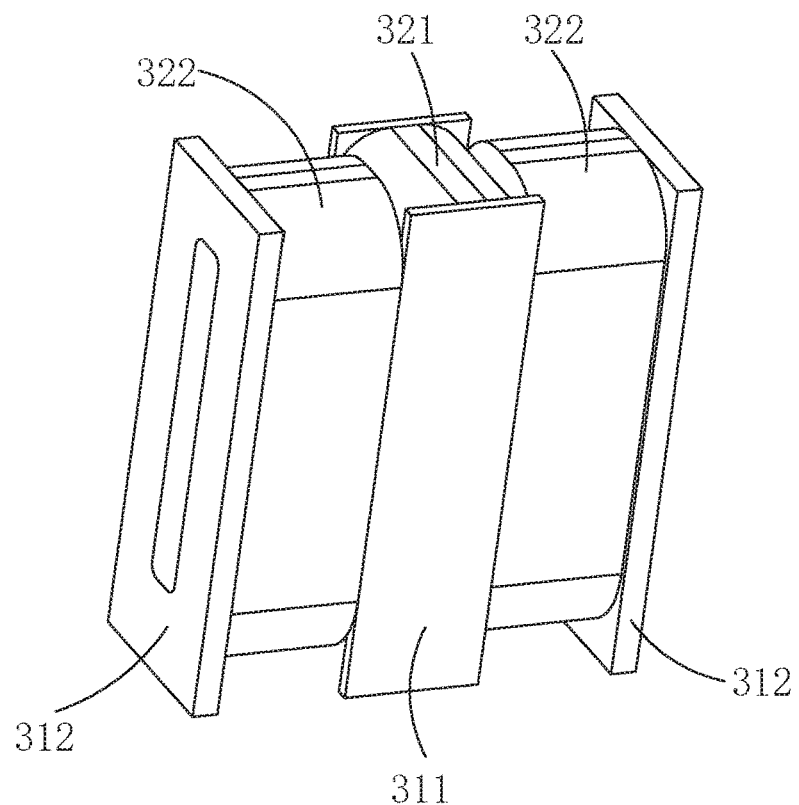
FIG. 6 is an illustrative assembled view of some members of the linear motor in accordance with an embodiment of the present invention.
Figure 7:
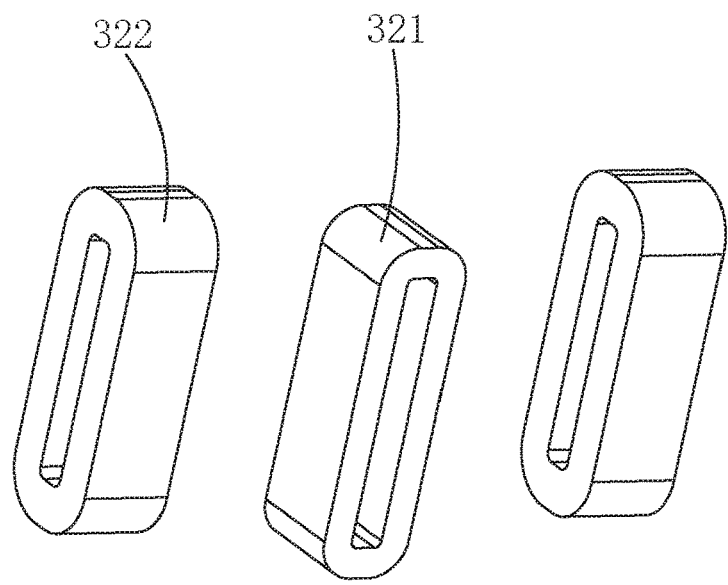
FIG. 7 is an illustrative exploded of coils of the linear motor in accordance with an embodiment of the present invention.

Please referring to FIGS. 6 to 8, the stator 30 includes an iron core 31 fixed to the housing 10 and a coil 32 winded on the iron core 31. The iron core 31 includes a middle portion 31a for winding the coil 32 and two pole shoes 31b positioned at two ends of the middle portion 31a. The pole shoes 31b is fixed to the lower cover 13. Further, the iron core 31 includes a first iron core 311 and a second iron core 312 that are set vertical to each other, the coil 32 includes a first coil 321 winded on the first iron core 311 and a second coil 322 winded on the second iron core 312, and the winding directions of the first coil 321 and the second coil 322 are perpendicular to each other. Herein the winding direction refers to the thickness direction in which a single wire is winded. Specifically, there are two second iron cores 312, one is positioned at one side of the first iron core 311 and the other is positioned at the other side of the first iron core 311. In the exemplary embodiment, the second cores 312 are disposed along the direction parallel to the second sidewall 232, and the first core 311 is disposed along the direction parallel to the first sidewall 231. In other embodiments, the second cores 312 may be set parallel to the first sidewall 231 and the first iron core 311 may be set parallel to the second sidewall 232, as long as the winding directions of the first coil 321 and the second coils 322 are perpendicular to each other.

Figure 5:
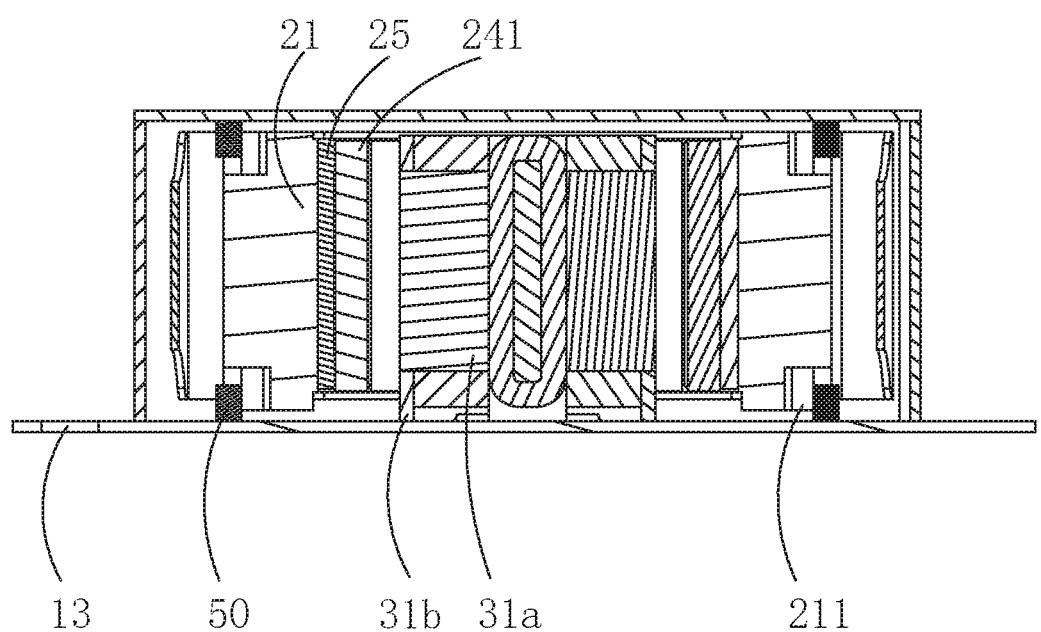
FIG. 5 is a cross-sectional view of the linear motor in FIG. 1 taken along line A-A.

Please referring to FIG. 5, in the exemplary embodiment, the linear motor 100 includes a baffle plate 50 fixed to the upper cover 12 and the lower cover 13. The mass block 21 is provided with an avoiding portion 211 for avoiding the baffle plate 50; the baffle plate 50 is spaced from the avoiding portion 211. During vibration, the baffle plate 50 effectively prevents the performance reduction of the flexible support 40 due to an excessive deformation by resisting the mass block 21.

The flexible support 40 includes a first fixing portion 41 fixedly connected to the middle housing 11, a second fixing portion 42 fixedly connected to the mass block 21, and a connecting portion 43 connected with the first fixing portion 41 and the second fixing portion 42. The first fixing portion 41 and the second fixing portion 42 are respectively welded to the middle housing 11 and the mass block 21 through a welding member 44.

Figure 9:
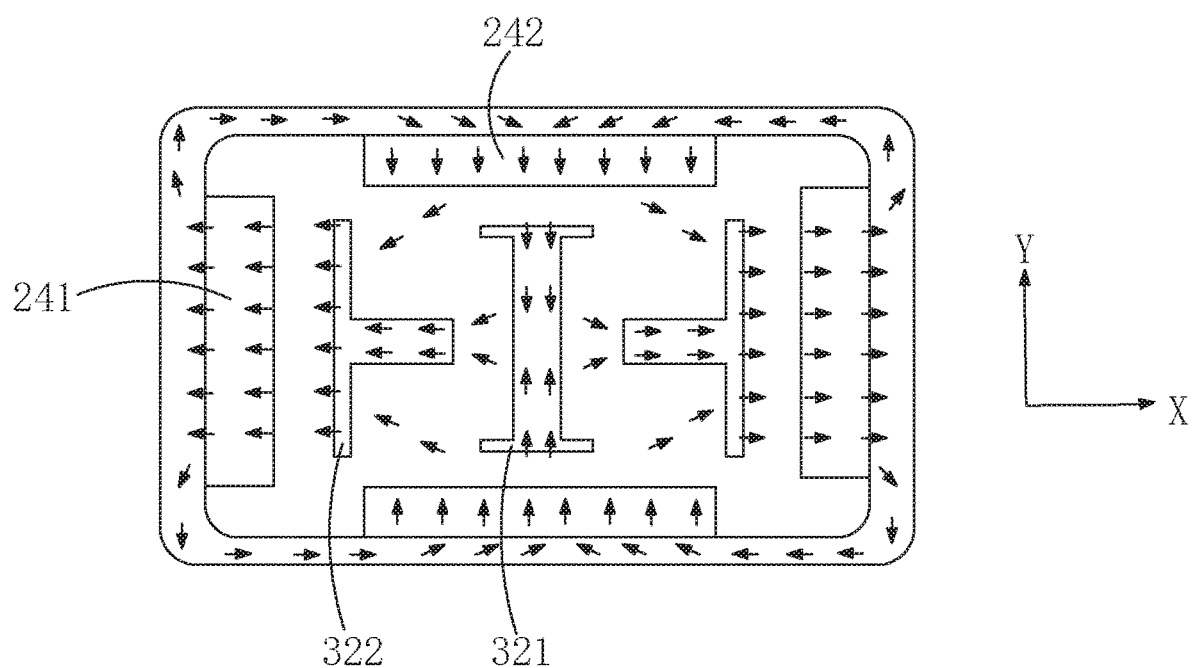
FIG. 9 is a schematic diagram showing the polarization directions of the linear motor in accordance with an embodiment of the present invention.

FIG. 9 is a schematic diagram showing the polarization directions of the linear motor when no power is applied, and at this time, the vibrator remains stationary. The first coil 321 and the two second coils 322 are connected in series with each other, that is, they are led out by one lead wire. In case current is applied, the two second coils 322 are energized in a same direction and will generate driving forces in a same direction, such as horizontal X direction; simultaneously, the first coil 321 generates a driving force in a horizontal Y direction. The flexible support 40 has different modalities in the X direction and Y direction, and different resonance frequencies are required to excite the corresponding modality to make the flexible support 40 drive the vibrator 20 to generate vibration. Therefore, by inputting different currents to the coil, the modality of the flexible support 40 in the X direction or the modality of the flexible support 40 in the Y direction may be excited, so that the motor can vibrate in two different directions to generate different vibrations.

Specifically, in case the frequency of energization is equal to the resonance frequency of the flexible support 40 in the X direction, the flexible support 40 drives the vibrator 20 to vibrate in the X direction. In case the frequency of energization is equal to the resonance frequency of the flexible support 40 in the Y direction, the flexible support 40 drives the vibrator 20 to vibrate in the Y direction. It should be understood that, since the three coils are connected in series with each other, the linear motor 100 can only vibrate in one direction under a same energizing current. For changing the vibrating direction of the linear motor 100, it needs to change the energizing current.

The linear motor of the present invention is provided with magnetic assemblies that are perpendicular to each other and arranged linearly, which is convenient to be assembled. The linear motor generates driving forces in two different directions of X and Y by utilizing different magnetic-field components; by matching with the flexible support of the present invention, the linear motor may realize a double f0 vibration output. It not only effectively widens the working frequency band of the motor, but also enriches the vibration effect of the motor.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the disclosure to the full extent indicated by the broad general meaning of the terms where the appended claims are expressed.

What is claimed is:

1. A linear motor, comprising:
   a housing having a receiving cavity;
   a vibrator received in the receiving cavity;
   a stator received in the receiving cavity; and
   a flexible support connecting to the housing and suspending the vibrator in the receiving cavity;
   the stator comprising:
      an iron core fixed to the housing; and
      a coil wound on the iron core;
   wherein the iron core comprises a first iron core and a second iron core perpendicular to the first iron core, the coil comprises a first coil wound on the first iron core and a second coil wound on the second iron core, and the winding directions of the first coil and the second coil are perpendicular to each other;
   the first coil and second coil are connected in series with each other, the linear motor only vibrates in one direction along a x direction or a y direction perpendicular to the x direction under a same energizing current, the linear motor can change a vibrating direction by changing the energizing current.

2. The linear motor according to claim 1, wherein the second iron core comprises two iron cores, a first one of the second iron ores is disposed at one side of the first iron core and a second one of the second iron cores is disposed at an other side of the first iron core.

3. The linear motor according to claim 1, wherein the vibrator comprises a mass block fixedly connected to the flexible support, the mass block comprises a through hole passing through the mass block along a direction vertical to a vibrating direction of the vibrator, and the iron core and the coil both extend into the through hole.

4. The linear motor according to claim 3, wherein the mass block comprises an inner wall in rectangular shape, the through hole is formed by the inner wall, the inner wall comprises a first sidewall parallel to a short axis and a second sidewall connected to the first sidewall and parallel to a long axis, and the second iron core is disposed parallel to the second sidewall.

5. The linear motor according to claim 4, wherein the vibrator further comprises a magnetic steel fixed to the inner wall, and the magnetic steel is disposed spaced from the first coil and the second coil respectively.

6. The linear motor according to claim 5, wherein the magnetic steel comprises a first magnetic steel fixed to the first sidewall and a second magnetic steel fixed to the second sidewall.

7. The linear motor according to claim 6, wherein the first magnetic steel is magnetized along a direction vertical to a thickness direction of the first sidewall, the first magnetic steel comprises two, and magnetic poles of the two first magnetic steels are oppositely arranged.

8. The linear motor according to claim 7, wherein the second magnetic steel is magnetized along a direction vertical to a thickness direction of the second sidewall, the second magnetic steel comprises two, and magnetic poles of the two second magnetic steels are oppositely arranged.

9. The linear motor according to claim 6, wherein the vibrator further comprises a concentrating flux plate disposed between the magnetic steel and the inner wall.

10. The linear motor according to claim 3, wherein the iron core comprises a middle portion for winding the coil and two pole shoes located at two ends of the middle portion, and the pole shoes are fixed to the housing.

11. The linear motor according to claim 10, wherein the housing comprises a middle housing, an upper cover covering one end of the middle housing, and a lower cover covering an other end of the middle housing, the middle housing, the receiving cavity is formed by the upper cover, and the lower cover cooperatively, and the pole shoes are fixed to the lower cover.

12. The linear motor according to claim 11, wherein the linear motor comprises a baffle plate fixed to the upper cover, and the mass block is provided with an avoiding portion for avoiding the baffle plate.

13. The linear motor according to claim 12, wherein the flexible support includes a first fixing portion fixedly connected to the middle housing, a second fixing portion fixedly connected to the mass block, and a connecting portion connected with the first fixing portion and the second fixing portion.

14. The linear motor according to claim 11, wherein the linear motor comprises a baffle plate fixed to the lower cover, and the mass block is provided with an avoiding portion for avoiding the baffle plate.

15. The linear motor according to claim 11, wherein the linear motor comprises a baffle plate fixed to the upper cover and the lower cover, and the mass block is provided with an avoiding portion for avoiding the baffle plate.

16. The linear motor according to claim 1, wherein a frequency of energization is equal to a resonance frequency of the flexible support in the X direction, the flexible support drives the vibrator to vibrate in the X direction.

17. The linear motor according to claim 1, wherein a frequency of energization is equal to a resonance frequency of the flexible support in the Y direction, the flexible support drives the vibrator to vibrate in the Y direction.

* * * * *